United States Patent
Schlereth (10) Patent No.: US 9,489,369 B2
(45) Date of Patent: Nov. 8, 2016

(54) SPREAD SHEET APPLICATION HAVING MULTIDIMENSIONAL CELLS

(75) Inventor: Thomas Schlereth, München (DE)

(73) Assignee: CAN DO GMBH, Munich (DE)

( * ) Notice: Subject to any disclaimer, the term of this patent is extended or adjusted under 35 U.S.C. 154(b) by 989 days.

(21) Appl. No.: 13/214,279

(22) Filed: Aug. 22, 2011

(65) Prior Publication Data

US 2013/0055059 A1    Feb. 28, 2013

(51) Int. Cl.
*G06F 17/24* (2006.01)

(52) U.S. Cl.
CPC ................... *G06F 17/247* (2013.01)

(58) Field of Classification Search
USPC ........................................................ 715/220
See application file for complete search history.

(56) References Cited

U.S. PATENT DOCUMENTS

| | | | |
|---|---|---|---|
| 5,721,847 A * | 2/1998 | Johnson | 715/786 |
| 6,701,485 B1 * | 3/2004 | Igra et al. | 715/210 |
| 7,624,339 B1 * | 11/2009 | Engel et al. | 715/214 |
| 2002/0091728 A1 * | 7/2002 | Kjaer et al. | 707/503 |
| 2006/0195424 A1 * | 8/2006 | Wiest et al. | 707/3 |
| 2008/0276161 A1 * | 11/2008 | Slavens | 715/213 |
| 2010/0115391 A1 * | 5/2010 | Engel et al. | 715/212 |
| 2012/0313953 A1 * | 12/2012 | Owen et al. | 345/581 |
| 2013/0007577 A1 * | 1/2013 | Hammoud | 715/205 |

* cited by examiner

*Primary Examiner* — Frank D Mills
(74) *Attorney, Agent, or Firm* — Manelli Selter PLLC; Edward J. Stemberger (57) ABSTRACT

The invention relates to a method for modifying the content of one or a plurality of cells of a spread sheet or a report which is associated with a spread sheet having a number of cells which are displayed in rows and columns, comprising: detecting a user request to modify the content of one or a plurality of cells, when a user request has been recognized, retrieving and processing a predetermined entry from a storage medium, wherein the storage medium includes a number of different entries, which are processed consecutively, wherein, each time a user request has been recognized, a predetermined next entry is processed.

23 Claims, 5 Drawing Sheets

SPREAD SHEET APPLICATION HAVING MULTIDIMENSIONAL CELLS

BACKGROUND

Spread sheet software applications are generally used by many different users for storing, manipulating or displaying data. A typical spread sheet usually comprises a limited number of cells which are arranged in rows and columns. Each of the cells may contain specific data, such as values, functions, formulas, strings or other data.

Many well-known spread sheet application programs, such as Microsoft® Excel®, allow making user defined reports or so-called pivot-tables from the actual spread sheet data. For creating a report or pivot-table, respectively, any desired data of the spread sheet may be selected and displayed in a separate table. The data included in a report or pivot-table is usually also presented within individual cells which are arranged in rows and columns. Therefore, such a report or pivot-table is also referred to as a "spread sheet" within this application.

Data which is included in a single column of a spread sheet usually refers to one type of information, such as "task", "cost", "amount" or "effort". If another category of information is to be added to a given spread sheet, an additional column has to created and arranged at a certain position of the spread sheet. As the number of lines and rows of a spread sheet grows with the complexity of a project, the corresponding spread sheet quickly becomes very large and confusing. For instance, if the cost of different tasks within a project is to be displayed in different currencies, such as USD, EUR or JPY, a separate column for each currency has to be provided in the spread sheet. Thereby, the dimensions of a spreadsheet may grow excessively which makes it difficult to locate and extract any desired information.

SUMMARY

The summary is provided to introduce a selection of concepts in a simplified form that are further described below in the detailed description. The summary is not intended to identify key features or essential features of the claimed subject-matter nor is it intended to be used as an aid in determining the scope of the claimed subject-matter.

According to the invention, a method for modifying the content of one or a plurality of cells of a spread sheet or of any kind of report, having a number of cells which are displayed in rows and columns, comprises:
  detecting a user request to modify the content of one or a plurality of cells;
  when such a user request has been recognized, retrieving and processing a predetermined entry from a storage medium, wherein the storage medium includes a number of different entries, which are processed consecutively; and
  each time the user request is repeated, retrieving a predetermined next entry from the storage medium and modifying the content of one or a plurality of cells according to the retrieved entry from the storage medium.

Preferably, the content of one or more cells may be modified by manipulating a cell or a control field, which is assigned to the cell or cells, respectively, in a predetermined manner. According to one embodiment of the invention, appropriate control fields are provided, e.g. one or more control buttons, which may be operated by the user in order to change the content of one or more cells at the same time.

Also, at least some, preferably all of the cells of a spreadsheet may be sensitive to a given user operation, such as clicking or dragging. A user request to modify the content of one or more cells is preferably recognized when a control field or an individual cell is manipulated in a predetermined manner.

When a cell or a control field is manipulated repeatedly, the corresponding entries of the storage medium are successively processed in a given order. Thereby, the content of one or a plurality of cells may be changed in a predetermined manner without recourse to pull-down menus or any other kind of menus, just by repeating a certain user request, like repeatedly clicking on a cell or a given control field. Thus, the content of one or a plurality of cells may be changed very easily.

Principally, a user request may refer to a modification of data or data format or to a change of the position of a cell. If the user request refers to a modification of data, the data of one or more cells are modified according to the associated commands, which are stored in the storage medium. For example, the currency of an amount which is displayed in one or more cells may be changed from USD to EUR to JPY by repeatedly manipulating the same control field which is associated with the cell or cells, respectively. If the user request refers to a modification of data format, the data format of one or more cells is amended according to the associated data entries, which are retrieved from the storage medium. For example, the letter type of the content of one or more cells may be changed from "bold" to "italics" to "underlined" by repeatedly manipulating the same control field which is associated with the cell or cells, respectively. Thereby the data entries of the associated cells change accordingly. Finally, if the user request refers to a change of position of a cell or a number of cells, the cells are moved accordingly. As an example, a given cell may be moved downward by manipulating a control function in a predetermined manner, wherein the space where the cell has been originally located, receives a predetermined value such as NUL for instance.

The modification which is performed by means of a user request is preferably determined by the type of information that is contained in a cell, or by the cell or data format of the manipulated cell, or by the type of control field which is manipulated. If, for instance, the data entry of a cell belongs to the category "cost" which is displayed in US Dollars at the moment, the amount may be changed to Euro, Japanese Yen or Chinese Yuan, by repeatedly clicking on the cell or by repeatedly performing any other kind of predetermined user request, such as repeatedly manipulating an associated control field. In another example, the data format, such as "colour", of one or a plurality of cells may be changed consecutively in a given order, e.g. from black to blue to red and to yellow by repeatedly clicking on the cell or by repeatedly performing any other kind of predetermined user request, such as repeatedly manipulating an associated control field. In other words, a predetermined modification of one or more cells may be carried out by means of repeated manipulation of a cell or an associated control field.

According to a preferred embodiment of the invention, the number of entries which are processed by repeatedly manipulating a cell or a control field is preferably limited to a number smaller than ten, in particular to about four. However, the number of entries, which are processed consecutively, is preferably more than two. The entries of the storage medium are preferably looped through, i.e. after a last entry has been processed, the first entry is retrieved from the storage medium and processed.

In order to modify the content of one or more cells, the user may click, double-click, drag or perform any other predetermined action within the area of a cell or a control field—with or without pressing an additional key—by means of any well-known input device, such as a computer mouse. The user may click on a certain area within a cell, thereby causing the content of the cell to change. Likewise, a vertex of a cell may be dragged to initiate a modification of the cell content.

The term "storage medium", as it is used in the description and the claims, refers to any well known technology for storing information such as hard discs, RAM, ROM, EPROM, in particular.

According to a preferred embodiment of the invention, the entries of the storage medium, which are consecutively processed, when a cell or control field is repeatedly manipulated, may be defined by the user. For example, a list of various commands may be presented to the user from which the user may select the ones he desires. When a number of commands has been selected, the selected commands are consecutively processed when a cell or a control field is manipulated. Thereby, the cell or cells are modified correspondingly.

Once a user request has been recognized, the cells which are affected by the user request are preferably displayed in form of 3D-objects and are turned upon every request so as to show another facet of the 3D-object comprising a modified content. After that, the cells of the spread sheet may be displayed in a standard 2D-mode again. According to another display mode, the cells of the spread sheet or the control fields are generally displayed in 3D mode and turned upon a user request.

A control field according to the invention may be assigned to an individual or a plurality of cells. A more sophisticated embodiment of the spread sheet application program provides control fields which are assigned to an entire row or column of the spread sheet. In this case, the manipulation of a control field causes the content of several or all cells of the associated row/column to be modified in a predetermined manner. The type of the control field may define the type of modification, which is carried out when the control field is manipulated. The type of the control field is preferably indicated in the control field, for instance as a text or a symbol.

When a control field is assigned to a plurality of cells, such as an entire column, preferably only those cells are affected by manipulation of the control field which have not been "locked" before. According to a special embodiment of the present invention, one or more individual cells may be exempt from manipulation by a control field, for instance by means of clicking on the cell in a certain area, by selecting a corresponding command from a menu, by individually setting a cell to another value or by any other appropriate action.

A control field according to the invention may be displayed in the form of a 3D-object such as a 3D-cube. The control field may turn on every manipulation.

The type of modifications that are carried out when a control field is repeatedly manipulated may be preset by the user.

According to a particular embodiment of the invention, a control field library is provided from which one or more control fields may be selected by the user. Preferably, the control fields may be dragged from the library and placed adjacent to a desired row or column via drag and drop. Thereby the control field is assigned to a certain row or column.

Additionally, one or more cells may be displayed in a standard mode or an extended mode, in which additional information, which may refer to the data which is displayed in standard mode, is shown. The display mode may be changed by performing a predetermined action within the area of a cell or a control field such as clicking on a special button or double-clicking for instance.

DETAILED DESCRIPTION OF AN EXEMPLARY EMBODIMENT

In a detailed description referring now to the drawings, various aspects of the invention will be described by way of example. In particular, FIG. 1 and the corresponding description are intended to provide a brief, general description of a suitable computing environment in which embodiments of the present invention may be implemented.

For the purpose of the present invention, any suitable type of computer system may be used including hand-held devices, desktop computers, laptops and the like. Distributed computing environments may also be used where tasks are preformed by remote processing devices that are linked through a communication network. In a distributed computing environment, program modules may be located in both local and remote storage devices.

Figure 1:
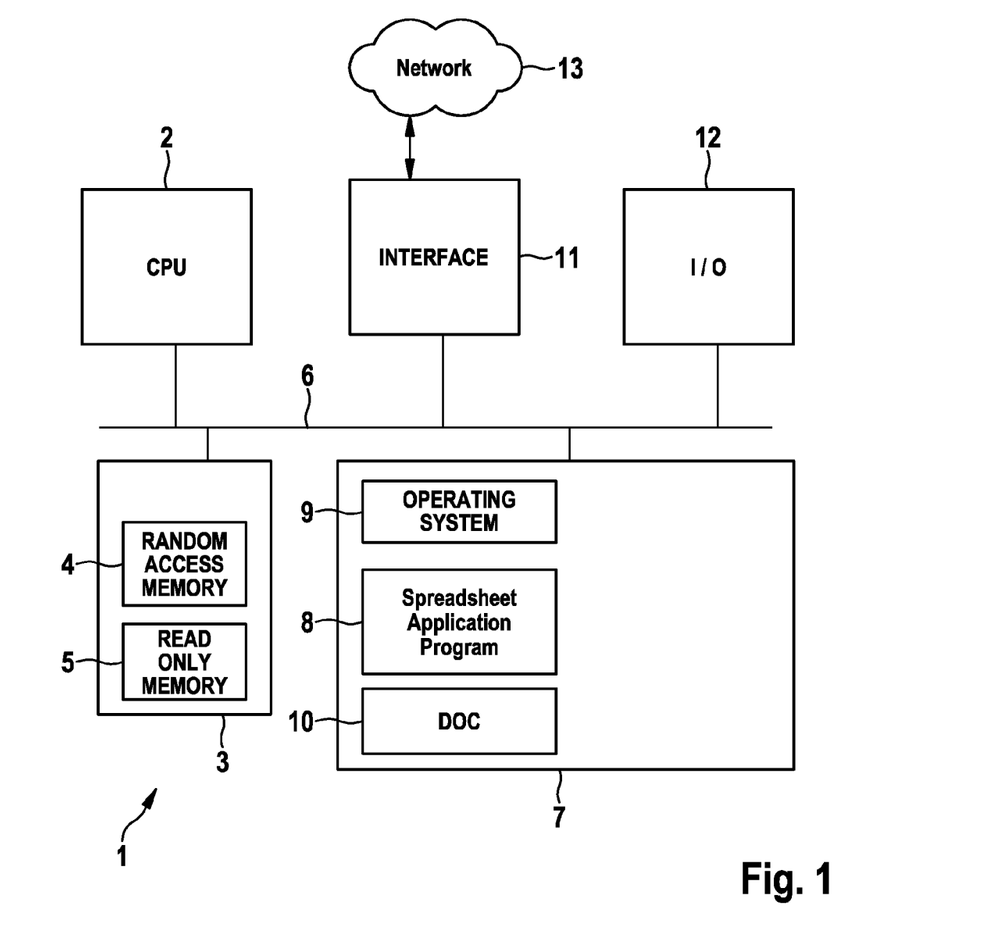
FIG. 1 illustrates an exemplary computing architecture for a computer.

In FIG. 1, an exemplary computer architecture for a computer 1 utilized in various embodiments is shown. The computer architecture of FIG. 1 may be configured in many different ways such as a server, a personal computer, a hand-held computer and the like. The computer 1 includes a central processing unit 2 (CPU), a system memory 3, including a random access memory 4 (RAM) and a read-only memory 5 (ROM) and a system bus 6 that couples the memory to the CPU 2. Some basic routines for data processing and for input/output-management may be stored in the ROM 5. The computer 1 further includes a hard disc 7, on which an operating system 9 and other application programs such as a spread sheet application program 8 may be stored.

The hard disc 7 is connected to the CPU 2 via the bus 6. Although the description of the mass storage device 7 refers to a hard disc, the storage device may be any other available storage medium that can be accessed by the computer 1.

In the illustrated embodiment, the computer 1 is connected to a network 13, such as the internet or a LAN, via a network interface 11. The computer 1 may also include an input/output controller 12 for receiving and processing input from a number of well-known devices, such as: keyboard, mouse, electronic pen and the like. Similarly, the input/output controller 12 may provide output to a display screen, a printer or some other type of device.

The storage device or a hard disc 7, respectively, and the RAM 4 may store a spread sheet application program 8 such as Microsoft Excel®. An exemplary spread sheet document is referenced by reference number 10.

Figure 2:
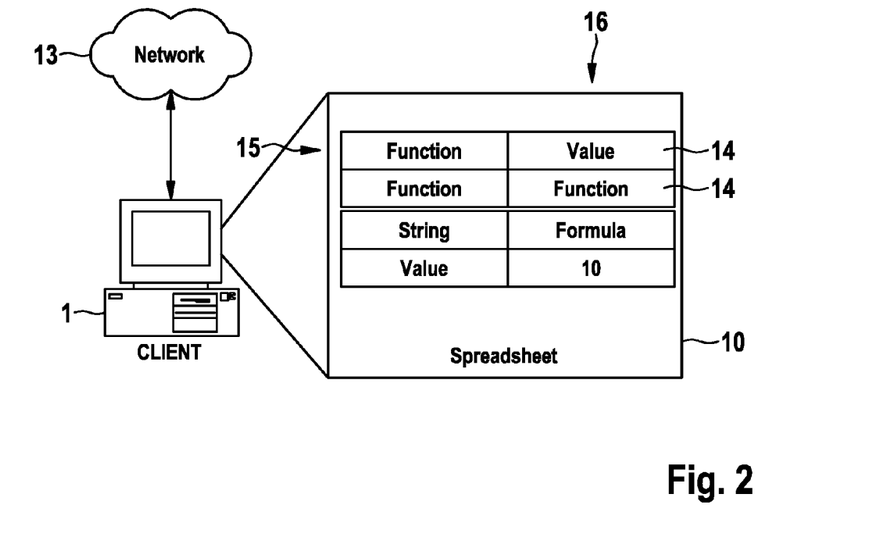
FIG. 2 illustrates an overview of a spread sheet system.

FIG. 2 illustrates an overview of a computer system comprising a client computer 1 which is connected to the network 13, such as the internet. On the computer 1, a spread sheet application program is run which displays a spread sheet on the computer screen. An enlarged view of the display is shown on the right hand side of the computer 1. In the illustrated example, a typical spread sheet, having a number of cells 14 which are arranged in rows 15 and columns 16, is shown. The user can enter any kind of data, like values, functions, strings or formulas, via a user interface, such as a keyboard. The user may further edit or process the data as desired. CPU 2 performs operations relating to the cells 14 within the spread sheet 10. A spread sheet 10 may be any regular spread sheet or any selection of data associated with a spread sheet or a data base, such as a so-called pivot-table or spread sheet report, respectively. In the present description and claims, any kind of sheet having a number of cells which are displayed in rows and columns, is referred to as a "spread sheet".

Figure 3:
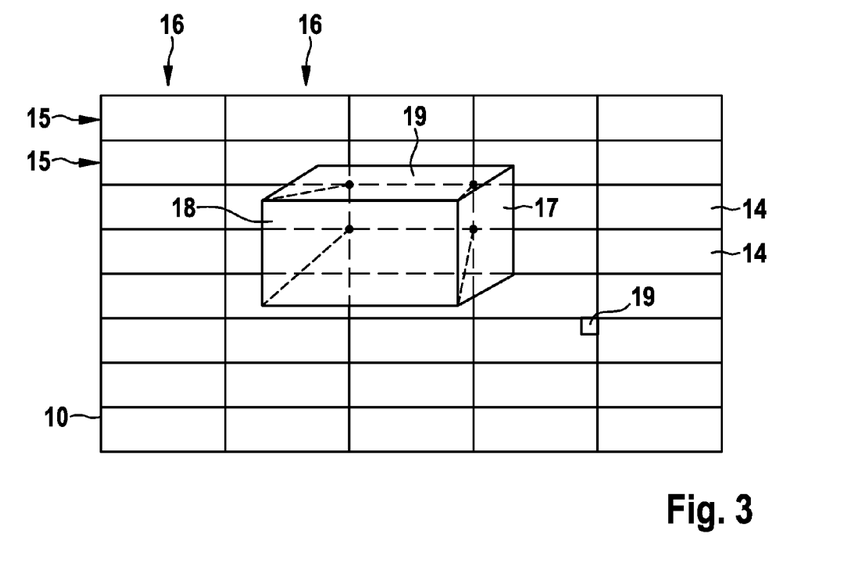
FIG. 3 illustrates a spread sheet which is displayed in a 3D-mode.

FIG. 3 shows an exemplary spread sheet having several rows 15 and columns 16. Other than in conventional spread sheet applications, the content of one or more cells may be modified by performing a predetermined action within the area of a cell. For instance, the user may click or double-click on a selected cell 14—anywhere within the area of the cell 14 or on a certain spot 19 which may be indicated by some icon in order to modify the content of the cell 14. Likewise, the user may perform a predetermined dragging movement, like dragging a vertex of a cell 14 or any other predetermined action in order to modify the content of the cell 14.

In conventional spread sheet application programs, the content of a cell may be modified by physically entering new data into the cell or by using control buttons which are usually displayed in a menu bar which is located externally from the spread sheet. Manipulation of the control button in a well-known spread sheet application generally allows activating or deactivating a given function, such as amending the character format from "bold" to "standard" or from "italic" to "standard". Each time, such a control button is pressed, the corresponding function is carried out or reset to a standard setting. By manipulating another type of button, a certain command is executed repeatedly, like for instance the calculation of a sum or the multiplication with a given factor.

According to an embodiment of the invention, a number of different functions—on/off-commands are not regarded as different functions within this description and the claims—may be successively executed by repeatedly performing the same, predetermined action, e.g. clicking on a cell 14 or on a control field 19 several times. Each time a user request has been recognized, a predetermined next entry is retrieved from a storage medium and processed. In the storage medium a number of different entries are stored, preferably more than two, which are consecutively processed in a given order. The entries may be any kind of commands or functions, respectively, by means of which the type of information within a cell or its format may be modified. The commands, which are executed consecutively when a cell or a control field is manipulated several times, preferably belong to the same data category as the manipulated cell or the control field. This will be explained later with reference to FIG. 6.

Referring back to FIG. 3, the spread sheet is generally depicted as a 2D-table in standard mode. When a user request to modify the content of one or more cells has been recognized, the cell or cells are visualized as 3D-objects, such as a 3D-cube 17, the size of which may be increased in relation to 2D mode. Then, the 3D-object 17 may be rotated around a horizontal axis for instance, such as to show another facet of the 3D-object 17 comprising another type of data or having another format. In the illustrated example, the 3D-object 17 is turned by 90° about a horizontal axis, so that the next facet 19 is directed to the user. The formerly shown facet 18 is rotated downwards and becomes non-visible. After this visualization of the modification, the graphical representation of the cell is set back to 2D-mode.

In the illustrated embodiment of FIG. 3, the 3D-cube 17 has got four facets which may be displayed to the user by rotating the 3D-cube 17 with respect to a horizontal or a vertical axis. Therefore, the set of entries that are consecutively processed in a given order, each time a user request has been recognized, preferably comprises a number of four entries. However, a set of entries may also include more or fewer than four entries, but preferably more than two. The entries are preferably processed in a loop.

Figure 4:
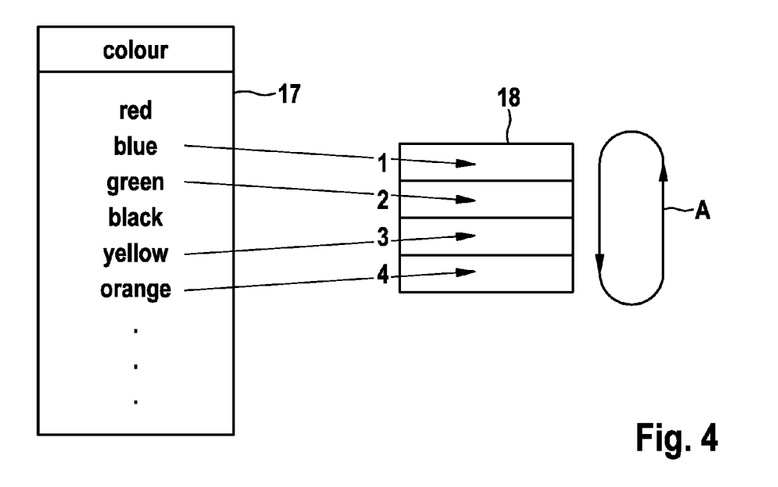
FIG. 4 illustrates a selection of different commands from a list of commands of the category "colour"

FIG. 4 illustrates the user specific selection of different commands which are consecutively processed each time a cell 14 or control field 19 is manipulated. In the present example, a list of different character formats is presented to the user in form of a table 17. In the illustrated embodiment, the user may select from a number of different colours like "red", "blue", "green", "black", "yellow", "orange", etc. and drag the desired options to a table 18 which represents the set of commands which are executed consecutively when a predetermined user action is performed repeatedly. In the present example, the table 18 comprises four entries which are processed within a loop A. I.e., after the last entry has been processed, the first entry is retrieved from the storage medium and processed. In the present example, the colour of the characters would change from blue to green to yellow and orange and back to blue, when a cell 14 or a control field is repeatedly manipulated in a predetermined manner.

Figure 5:
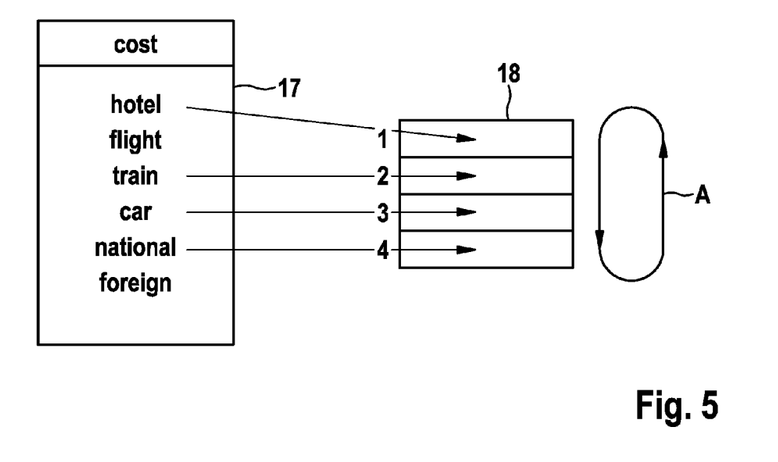
FIG. 5 illustrates a selection of certain commands from a list of commands of the category "cost"

FIG. 5 illustrates another example of user specific selection of different commands, which are consecutively processed when a certain user input is repeated several times. In the present example, the user may select from a list 17 of different data sub-categories within a given data category. In the present case, the user may select from different cost categories within the topic "costs", such as "hotel costs", "flight costs", "train costs", "car costs", "national costs" or "foreign costs". As explained before in relation to FIG. 2, the desired options may be dragged into a table 18 which represents those entries of a memory which are processed when a cell or control field 19 is manipulated repeatedly. In the present example, the user has selected "hotel costs", "train costs", "car costs" and "total national costs" to be displayed successively each time the cell 14 and/or control field 19 is manipulated.

Figure 6:
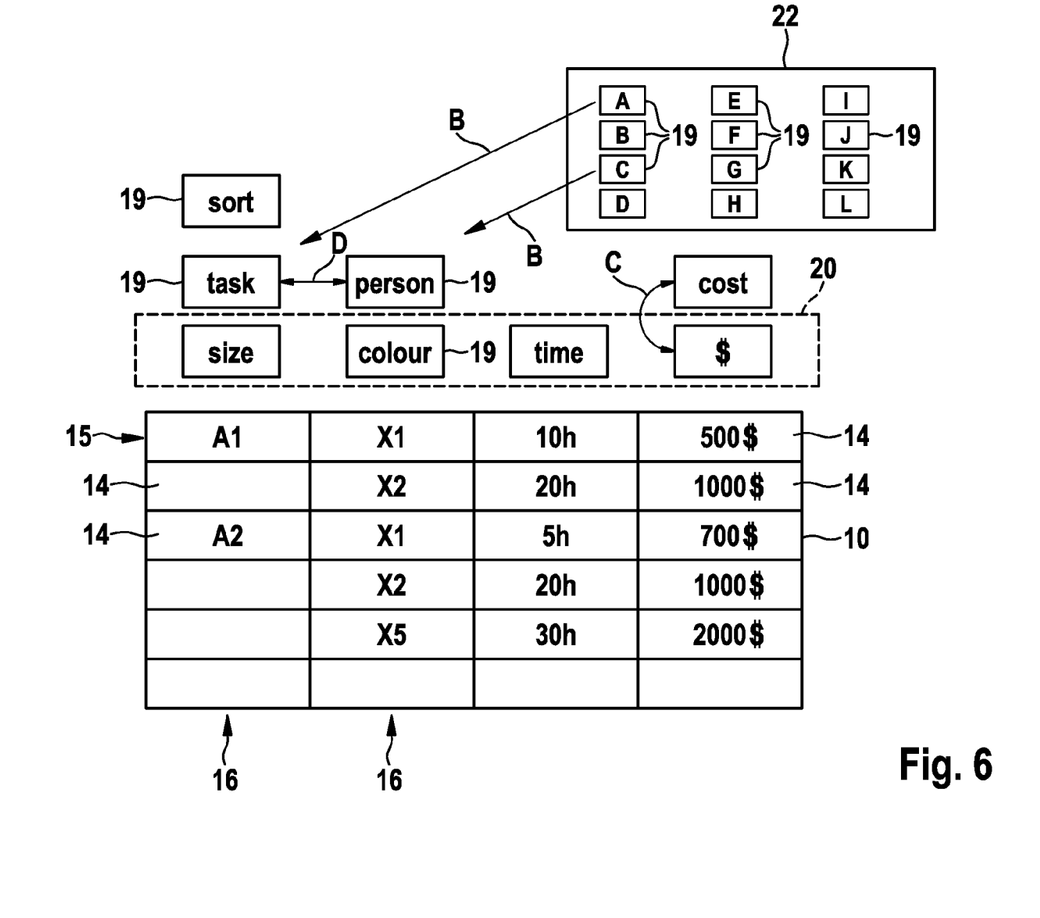
FIG. 6 illustrates an exemplary spread sheet including a number of control fields which are associated to the individual columns of the spread sheet.

FIG. 6 illustrates a more sophisticated embodiment of a spread sheet or a pivot-table providing a number of control fields 19. Each of the control fields 19 is assigned to a certain column 16 of the spread sheet 10, due to its particular location. In the illustrated embodiment, the control fields 19 are arranged above the associated column 16 of the spread sheet 10. Likewise, the control field 19 may also be arranged below a desired column 16 or may be part of the spread sheet (or pivot-table). Alternatively, control fields 19 may also be assigned to individual rows 15 of the spread sheet.

In the present example, one or more control fields 19 may be selected from a control field library 22 as desired. The selected control field e.g. may be dragged to a position close to a desired column 16, whereby the control field is associated with the respective column 16, as indicated by arrows B.

According to the invention, a control field may define the type of information which is displayed in the cells 14 of an associated row 15 or column 16, respectively. Another type of control field 19 may define the character format or cell format of the associated row 15 or column 16. By selecting a number of control fields 19 which define the data category which is displayed in the cells of an associated row 15 or column 16, a user may easily create a particular spread sheet. In the example of FIG. 6, the first column 16 displays the different tasks of a project, the second column 16 displays the people who are involved in working on the various tasks, the third column 16 shows time accounts of the people listed in the second column 16, and the fourth column 16 shows an amount of cost. Moreover, the size of the spread sheet 10 may of course be increased or decreased.

The format of the individual data entries within the cells 14 may be defined by means of the above-mentioned second type of control fields. In the example of FIG. 6, the font size is defined by a control field "size" 19 of the first column 16, and the font colour of the second column 16 is defined by a control field "colour" 19. The function and effect of the control fields 19 are explained in detail, hereafter.

In general, the type of information which is displayed in the cells of a row of column 16, as well as its data format, is defined by one or more associated control fields 19. In order to effect a modification of the cell content of an entire row 15 or column 16, an associated control field 19 has to be manipulated repeatedly in a predetermined manner as described with reference to FIG. 4 or 5. If, for instance, the control field "size", which is associated with the first column 16, is clicked repeatedly, the font size of the data included in this column 16 may be changed from 8 to 10 to 12 and 14. Likewise, if the control field "task" is clicked repeatedly, the task category may be amended. It is noted that individual cells within a column may be excluded from being changed. The latter may be achieved by completing any appropriate command, such as clicking on a certain field or selecting such a command from a menu. Also, a cell 14 is locked, if the cell has been manipulated individually, so as to show a different type of information or format than the other cells in the same column.

With regard to the second column 16 (from the left hand side), the font colour may be changed by clicking on the control field "colour". Likewise, the time format or the currency format may be changed by clicking on the corresponding control fields "time" or "$". Manipulation of the time control field will for example display the time in minutes, days or any other format. Clicking on the $ control field 19 will change the currency from USD to EUR to JPY and to YEN for example. By clicking on the cost control field, the cost category may be changed from travel costs to service costs to expenses or any other desired "cost" category. The associated data may be retrieved from a source spread sheet or another data base. The modifications, which are carried out when a control field 19 in manipulated, may be user defined or preset.

Besides the change of the data entries of an entire row 15 or column 16, the data entry of individual cells 14 may also be affected within the scope of the invention. For this purpose, an individual cell 14 or a selected group of cells 14 have to be manipulated in a predetermined manner, for example by clicking, double clicking or dragging, etc. Thereby, the type of a control field 19, which is placed in a so-called master area 20, determines the commands executed or the changes applied, respectively. Regarding the first column 16, manipulating an individual cell 14 of the first column will change the font size, for the master control field belongs to the category "font size". Likewise, regarding the second column 16, manipulating a cell of the second column 16 will change the font colour of that cell, regarding the third column 16, manipulating a cell 14 of the third column 16 will change the time format, and when a cell 14 of the fourth column 16 is manipulated, the currency format will change. However, the "task" category, the "person" category or the "cost" category are not changed according to the previous scheme. In order to change these categories, the control field 19 presently in use and thus residing in the master field 20 needs to be replaced by the new control field 19, as indicated by an arrow C In another embodiment having no master area 20, a particular control field may act as a master field, which determines the changes that are carried out, when an individual cell 14 of an associated row 15 or column 16 is manipulated. Such a master control field may be marked accordingly.

Besides the control fields 19 mentioned above, another type of control field may be implemented, which executes a predetermined function, such as a sorting function or a mathematical function. In the example of FIG. 6, the control field 19 "sort" is applied to the first column 16. Consequently, the first column is sorted by task. In order to sort the spread sheet by another data category, such as "person", the control field 19 "sort" may be moved to the second column 16, or the control fields 19 "task" and "person" may be interchanged, as indicated by an arrow D.

In order to add a column to a given spreadsheet, the column may be created by simply dragging a control field of any data type to a desired location, either in between two existing columns or to a boundary of the spreadsheet. The new column will then appear at the chosen location.

Figure 7:
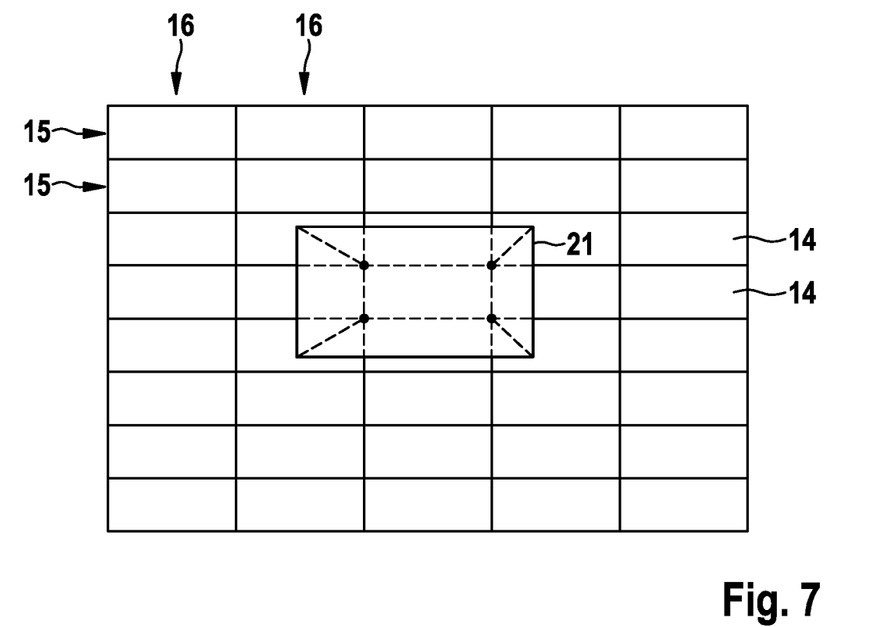
FIG. 7 shows an exemplary spread sheet in an extended mode.

FIG. 7 illustrates an additional feature of the spread sheet application program according to the invention. Said feature allows the display of individual cells in an extended mode in which additional information referring to the data, which is displayed in standard mode, is shown. In the illustration of FIG. 7, a cell 14 of the third column 16 has been manipulated in a predetermined manner, e.g. double-clicked so that the area of this cell 14 is expanded. The expanded area 21 of the cell 14 may show the originally displayed information augmented by supplementary information or it may show information different from the originally displayed information.

Figure 8:
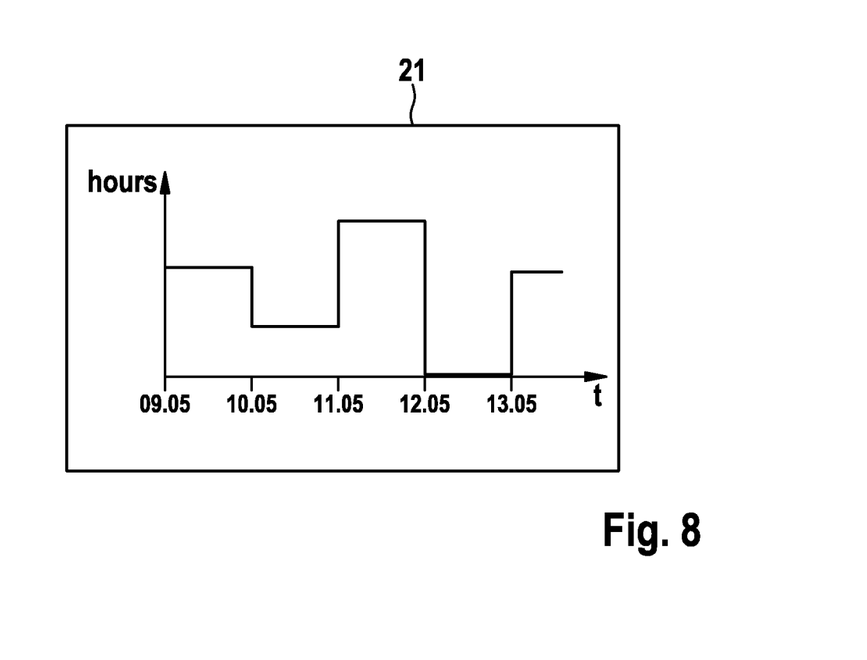
FIG. 8 illustrates an exemplary information which may be displayed in extended mode.

FIG. 8 exemplarily shows an expanded cell 21 containing additional information about the time account of a specific person. As shown in FIG. 8, the user gets more information on how much time was spent on a given day. The type of additional information, which is displayed in extended mode, may be defined by the user or may be preset.

The invention claimed is:
1. Method for modifying the content of one or a plurality of cells of a spread sheet or a report which is associated with a spread sheet having a number of cells which are displayed in rows and columns, comprising:
assigning several control fields to a single row or a single column of the spread sheet, wherein each of the control fields allows a user to subsequently execute a number of different commands each time when one of the control fields is manipulated by the user, and wherein a first type of the control fields serves to change the data category of the associated cells, and a second type of the control fields serves to change the data format of the associated cells or to execute a number of different mathematical functions in relation to the associated cells;

detecting, if one of the control fields is manipulated in a predetermined manner by a user in order to modify the content of a plurality of cells of the associated row or column;

when such a user request has been recognized, retrieving and processing a predetermined entry from a storage medium, depending on the type of the control field, wherein the storage medium includes a number of different entries, which are processed consecutively each time the user request is repeated; and modifying the content of a plurality of cells accordingly.

2. The method of claim 1, wherein a user request may refer to a modification of data or data format, or to a change of the position of a cell, and, if the user request refers to a modification of data, the data of one or a plurality of cells is modified according to the retrieved entry, if the user request refers to a modification of the data format, the data format of one or a plurality of cells is modified according to the retrieved entry, and if the user request refers to a change of position, the position of one or a plurality of cells is changed.

3. The method of claim 1, wherein the entries of the storage medium are consecutively retrieved from the storage medium in a given order, when the control field is repeatedly manipulated in a predetermined manner.

4. The method of claim 3, wherein the entries of the storage medium, which are associated with a control field, are processed within a loop, wherein after retrieving a last entry of the storage medium, the first entry is retrieved from the storage medium.

5. The method of claim 1, wherein a user request is recognized, when a user performs a predetermined action within the area of a control field which is associated with one or a plurality of cells.

6. The method of claim 3, wherein the entries of the storage medium, which are consecutively processed in a given order, belong to the same data category or the same format category as the manipulated cell or control field.

7. The method of claim 1, wherein the entries of the storage medium which are consecutively processed in a given order, may be defined by the user by means of a menu.

8. The method of claim 1, wherein on recognition of a user request, the cell or cells, which are affected by the user request, are displayed in form of a 3D-object, which is turned so as to show another facet of the 3D-object containing modified data.

9. The method of claim 1, wherein the control field determines the type of information which is displayed in the cells of the associated row or column, or the format of one or more of the cells.

10. The method of claim 1, wherein one of the control fields determines the modifications of data which are carried out when a single cell is manipulated in a predetermined manner.

11. The method of claim 1, wherein after recognition of a user request by which a control field is manipulated, the manipulated control field is displayed in form of a 3D-object which is turned so as to show another facet of the 3D-object.

12. The method of claim 1, wherein one or more control fields may be selected by the user from a control field library.

13. The method of claim 12, wherein one or more control fields may be dragged from the library and placed adjacent to a desired row or column via drag and drop.

14. The method of claim 1, wherein a display mode may be changed between standard mode and extended mode by performing a predetermined action within the area of a cell or a control field.

15. The method of claim 14, wherein the area of a cell will be expanded in the extended mode.

16. The method of claim 14, wherein the cell content is shown on the same facet of a 3D-object in standard and in extended mode.

17. A non-transitory computer-readable storage medium for modifying the content of one or a plurality of cells of a spread sheet having a number of cells which are displayed in rows and columns, the storage medium comprising a computer-readable code which executes the steps of:

assigning several control fields to a single row or a single column of the spread sheet, wherein each of the control fields allows a user to subsequently execute a number of different commands each time when one of the control fields is manipulated by the user, and wherein a first type of the control fields serves to change the data category of the associated cells, and a second type of the control fields serves to change the data format of the associated cells or to execute a number of different mathematical functions in relation to the associated cells;

detecting, if one of the control fields is manipulated in a predetermined manner by a user in order to modify the content of a plurality of cells; a user request to modify the content of one or a plurality of cells;

when such a user request has been recognized, retrieving and processing a predetermined entry from a storage medium, depending on the type of the control field;

wherein the storage medium includes a number of different entries, which are processed consecutively each time the user request is repeated; and modifying the content of a plurality of cells accordingly.

18. The computer-readable storage medium of claim 17, wherein a user request may refer to a modification of data or data format, or to a change of the position of a cell, and, if the user request refers to a modification of data, the data of one or a plurality of cells is modified according to the retrieved entry, if the user request refers to a modification of the data format, the data format of one or a plurality of cells is modified according to the retrieved entry, and if the user request refers to a change of position, the position of one or a plurality of cells is changed.

19. The computer-readable storage medium of claim 17, wherein the entries of the storage medium are consecutively processed in a given order, when a control field is repeatedly manipulated in a predetermined manner.

20. The computer-readable storage medium of claim 19, wherein the entries of the storage medium, which are associated with a cell or a control field, are processed within a loop, wherein after processing a last entry of the storage medium, the first entry is processed.

21. The computer-readable storage medium according to claim 1, wherein a user request is recognized, when a user performs a predetermined action within the area of a cell or within the area of a control field which is associated with one or a plurality of cells.

22. The computer-readable storage medium of claim 21, wherein the entries of the storage medium, which are consecutively retrieved from the storage medium in a given order, belong to the same data category or the same format category as the manipulated cell or control field.

23. A system for modifying the content of one or a plurality of cells of a spread sheet or a report having a number of cells which are displayed in rows and columns, comprising:

a processor having at least one computer hardware component and a computer-readable storage medium; and a spread sheet application configured to perform actions using the processor, the actions comprising:

assigning a first and at least one further control field to a single row or a single column of the spread sheet, wherein each of the control fields allows a user to subsequently execute a number of different commands each time when one of the control fields is manipulated by the user, and wherein a first type of the control fields serves to change the data category of the associated cells, and a second type of the control fields serves to change the data format of the associated cells or to execute a number of different mathematical functions in relation to the associated cells;

detecting, if one of the control fields is manipulated in a predetermined manner by a user in order to modify the content of a plurality of cells;

when such a user request has been recognized, retrieving a predetermined entry from a storage medium, depending on the type of the control field;

wherein the storage medium includes a number of different entries, which are processed consecutively each time a user request has been recognized; and modifying a plurality of cells according to the retrieved entry.

* * * * *